(12) United States Patent
Yun

(10) Patent No.: US 11,899,420 B2
(45) Date of Patent: Feb. 13, 2024

(54) APPARATUS AND METHOD FOR CONTROLLING RESONANCE SUPPRESSION OF MACHINE TOOL

(71) Applicant: DN SOLUTIONS CO., LTD., Changwon-si (KR)

(72) Inventor: Chul Yun, Changwon-Si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 460 days.

(21) Appl. No.: 17/268,875

(22) PCT Filed: Aug. 28, 2019

(86) PCT No.: PCT/KR2019/010975
§ 371 (c)(1),
(2) Date: Feb. 16, 2021

(87) PCT Pub. No.: WO2020/045975
PCT Pub. Date: Mar. 5, 2020

(65) Prior Publication Data
US 2021/0318664 A1    Oct. 14, 2021

(30) Foreign Application Priority Data

Aug. 31, 2018   (KR) ........................ 10-2018-0103425

(51) Int. Cl.
*H02P 27/08*        (2006.01)
*G05B 19/05*        (2006.01)

(52) U.S. Cl.
CPC ...... *G05B 19/05* (2013.01); *G05B 2219/1185* (2013.01)

(58) Field of Classification Search
CPC .. G05B 2219/1185; H02P 29/50; H02P 29/00; H02P 5/46
See application file for complete search history.

(56) References Cited

U.S. PATENT DOCUMENTS

2003/0184251 A1*  10/2003  Oyama ................... H02P 29/00
                                                                318/607
2007/0007926 A1*   1/2007  Iwashita ............ G05B 19/4141
                                                                318/625

FOREIGN PATENT DOCUMENTS

JP        H06319284 A      11/1994
JP       2013219884 A      10/2013
(Continued)

OTHER PUBLICATIONS

International Search Report of PCT/KR2019/010975, dated Dec. 4, 2019, English translation.
(Continued)

*Primary Examiner* — Muhammad S Islam
(74) *Attorney, Agent, or Firm* — STIP Law Group, LLC

(57) ABSTRACT

An apparatus for controlling resonance suppression of a machine tool according to the present disclosure includes: a numerical control part; a main operation part; a PLC configured to execute a control command by means of communication with the numerical control part or the main operation part; a servo drive configured to execute the control command of the PLC; a servo motor part configured to operate under control of the servo drive; and a power conversion part electrically connected to the servo motor part and the servo drive and configured to apply electrical energy to the servo motor part, wherein the power conversion part controls resonance suppression in accordance with an operation of the servo motor part by adjusting electrical energy to be applied to the servo motor part based on a signal from the servo drive.

7 Claims, 4 Drawing Sheets

(56) References Cited

FOREIGN PATENT DOCUMENTS

KR 20010007047 A 1/2001
WO WO02082194 A1 10/2002

OTHER PUBLICATIONS

Yun, Chul, The Resonance Characteristic Analysis and Suppression Controller Design Mehod for Speed Control of Parallel Connected Dual SPMSMs Fed by a Single Inverter, Kyungpook National University Ph, D , thesis on Enginnering, Dec. 2017, pp. 14-63, Daegu, South Korea.

* cited by examiner

[FIG 1]
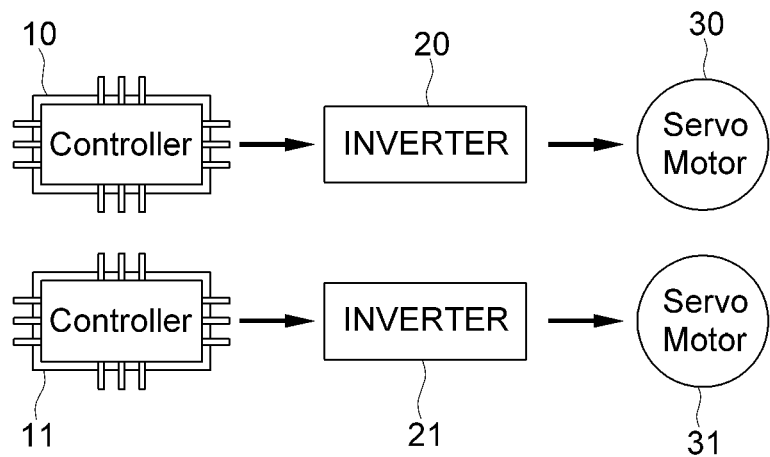
[FIG 2]
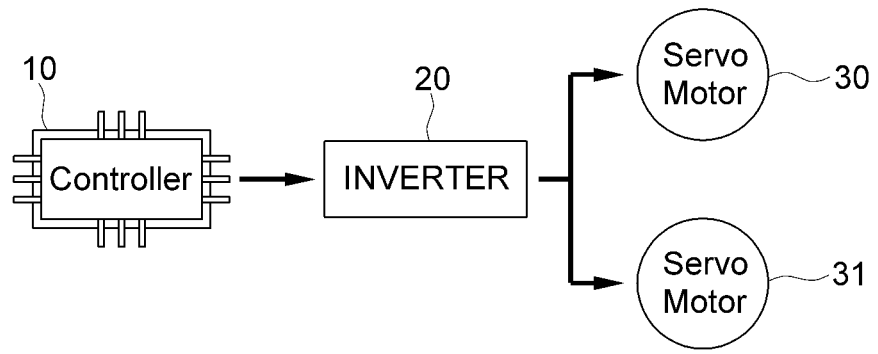

[FIG 3]
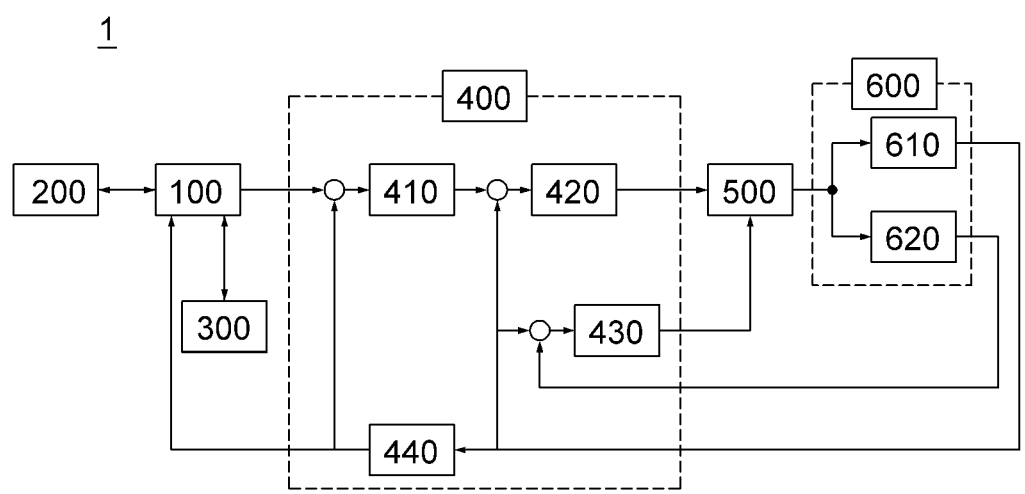
[FIG 4]
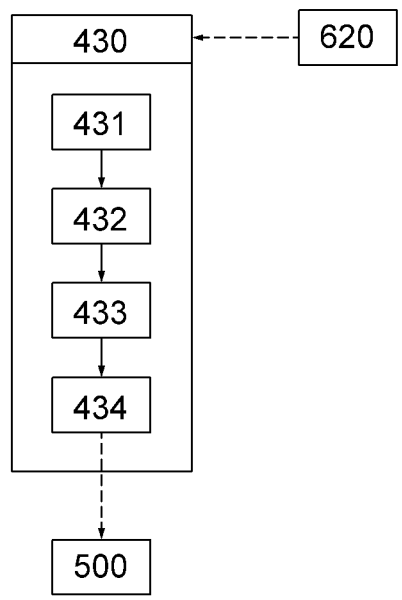

[FIG 5]
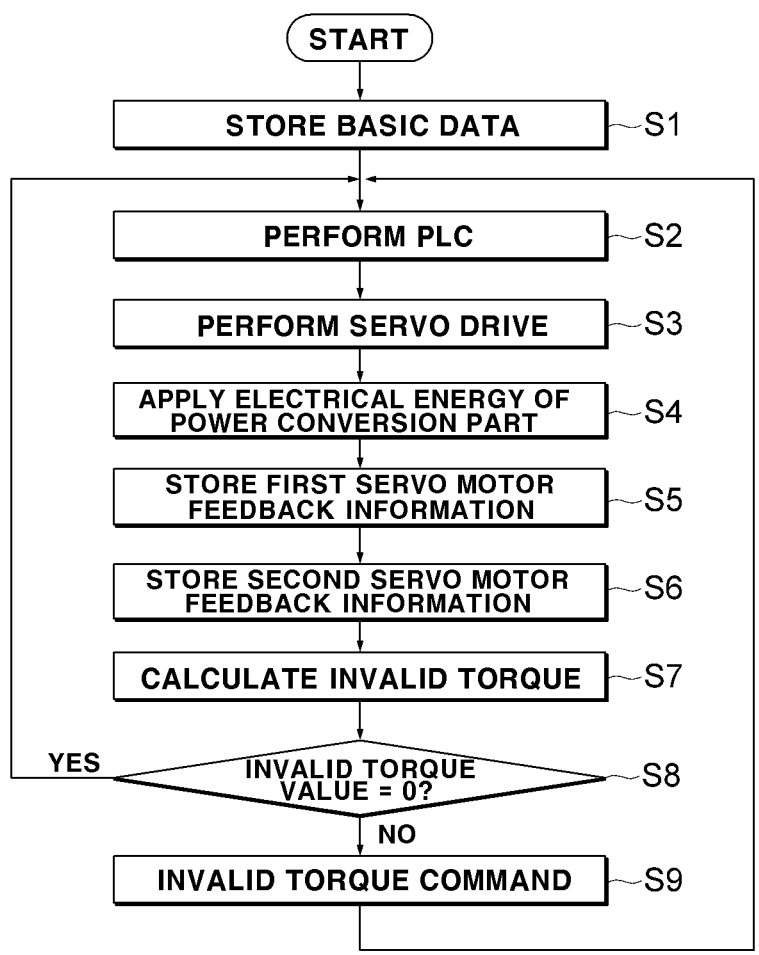

[FIG 6]
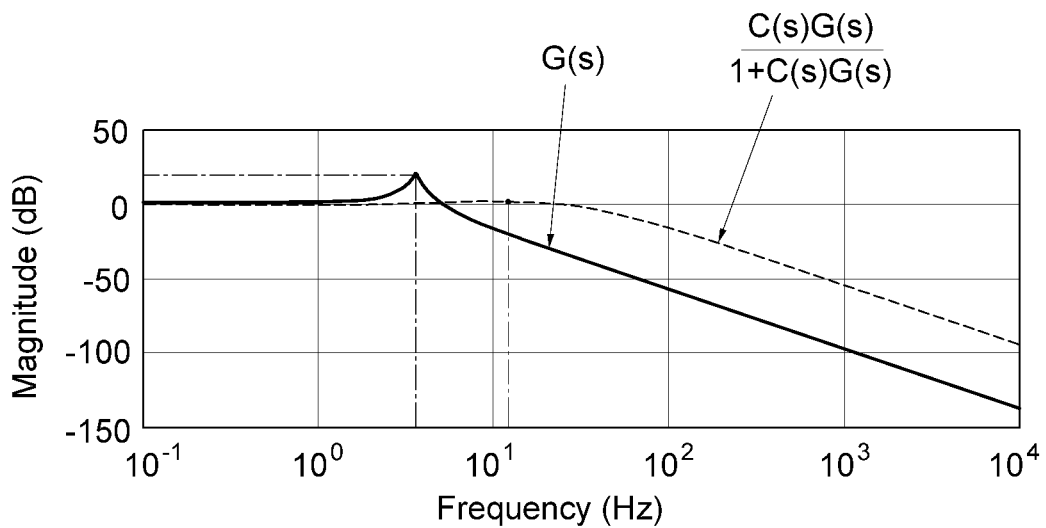
[FIG 7]
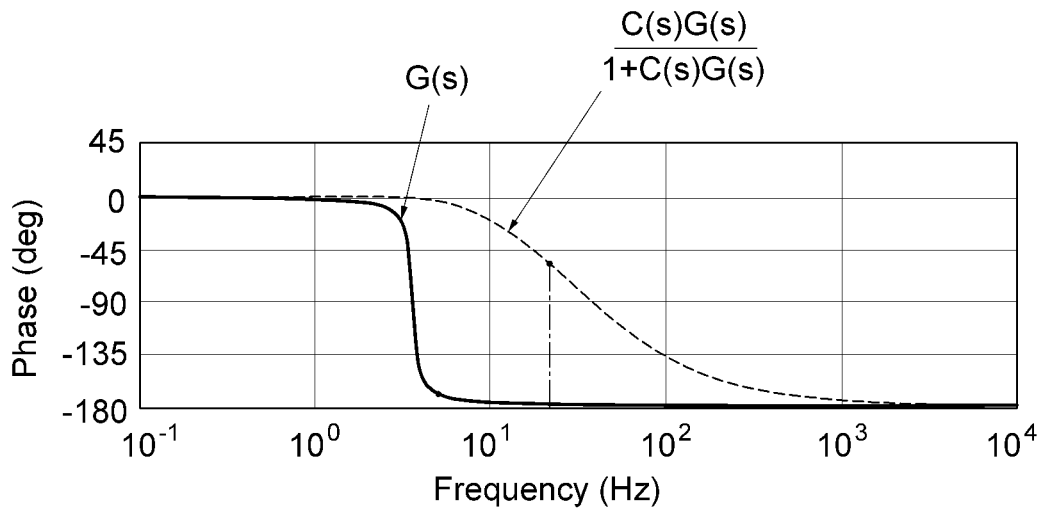

APPARATUS AND METHOD FOR CONTROLLING RESONANCE SUPPRESSION OF MACHINE TOOL

CROSS-REFERENCE TO RELATED APPLICATIONS

This application is the U.S. National Phase under 35 U.S.C. § 371 of International Application No. PCT/KR2019/010975 filed on Aug. 28, 2019, which in turn claims the benefit of Korean Application No. 10-2018-0103425 filed on Aug. 31, 2018, the disclosures of which are incorporated by reference into the present application.

TECHNICAL FIELD

The present disclosure relates to an apparatus and a method for controlling resonance suppression of a machine tool, and more particularly, to an apparatus and a method for controlling resonance suppression of a machine tool, wherein a resonance suppression control part adjusts electrical energy to be applied to a first servo motor and a second servo motor from a power conversion part based on an invalid torque command transmitted to the power conversion part in order to suppress resonance, which occurs when two servo motors operate in parallel, by a single power conversion part and a single servo drive, thereby improving stability and reliability of a machine tool, reducing manufacturing costs and maintenance costs, and miniaturizing the apparatus.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, and a CNC lathe are being widely used to suit the purpose of the corresponding work in various industrial sites.

In general, various types of currently used machine tools each have a control panel to which a numerical control (NC) technology or a computerized numerical control (CNC) technology is applied. The control panel is provided with a multifunctional switch or button, and a monitor.

In addition, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during the machining process.

In general, the machine tool is provided with a transfer unit configured to transfer the table, a tool post, the main shaft, the tailstock, and the steady rest along a transfer shaft in order to perform various types of machining.

Further, the machine tool generally uses a plurality of tools in order to perform various types of machining, and a tool magazine or a turret is used in the form of a tool storage place for receiving and storing the plurality of tools.

In addition, the machine tool is generally equipped with the automatic tool changer (ATC) configured to withdraw a specific tool from the tool magazine or remount the tool on the tool magazine based on an instruction of a numerical control unit in order to improve productivity of the machine tool.

Further, the machine tool is generally equipped with an automatic palette changer (APC) in order to minimize the non-processing time. The automatic palette changer (APC) automatically changes the palettes between a workpiece machining region and a workpiece loading region. The workpiece may be mounted on the palette.

In general, a servo motor is used to operate the automatic tool changer (ATC), the automatic palette changer (APC), the tailstock, or the steady rest of the machine tool.

A device, which controls the servo motor and thus finally controls the automatic tool changer (ATC), the automatic palette changer (APC), the tailstock, or the steady rest, is called a servo control device.

In particular, when a large-sized device such as a large-sized automatic palette changer (APC) is used or a high force is required, there is a limitation in terms of productivity and economic feasibility, and there is also a technical limitation in which sufficient torque cannot be obtained only by the single servo motor. For this reason, the two servo motors operate in parallel to operate a single shaft, and this is called tandem control.

However, as illustrated in FIG. 1, when the two servo motors are used in the related art, the servo control device in the related art is configured such that each of the inverters and each of the servo drives are coupled to each of the servo motors. That is, the servo control device operates in a multi-inverter/multi-servo motor manner in which a first inverter 20 and a first servo drive 10 are connected to a first servo motor 30, and a second inverter 21 and a second servo drive 11 are connected to a second servo motor 31.

However, because the separate inverters and the servo drives need to be coupled to the servo motors, respectively, in the case of the multi-inverter/multi-servo motor manner, there are problems in that the size of the apparatus is increased, manufacturing costs and maintenance costs are increased, and it is impossible to miniaturize the machine tool.

In order to solve the above-mentioned problems, a single-inverter/multi-servo motor manner has been proposed in which one inverter 20 and one servo drive 10 are connected to the two servo motors 30 and 31 and operated in parallel, as illustrated in FIG. 2.

However, unlike an induction motor in which a slip is present, the servo motor is a permanent magnet type synchronous motor having no slip, and as a result, the two servo motors need to be synchronized to enable a stable parallel operation without a speed deviation. Otherwise, because of resonance and step-out, there are problems in that stability and reliability of the servo control device deteriorate, and as a result, stability, reliability, and machining precision of the machine tool deteriorate.

In the related art, three types of apparatuses and methods for controlling resonance suppression have been proposed to solve the problem with the resonance suppression control. First, a damping control apparatus and a damping control method, which use an auxiliary inverter and an auxiliary winding, have been proposed, in which a main inverter and the auxiliary inverter need to be separately provided, a servo motor and the auxiliary winding need to be provided, and the two inverters in the related art need to be provided. As a result, there still remains a problem in that manufacturing costs are increased, and it is difficult to implement mass production.

Second, an active damping control apparatus and an active damping control method have been proposed, in which the resonance suppression control is designed as a simple empirical method. As a result, there are problems in that it is impossible to actively cope with actual resonance or many disturbances or variables, such that reliability and stability of a servo control apparatus are not ensured, but only manufacturing costs are increased.

Third, an apparatus and a method for reducing oscillation using a load oscillation analyzer have been proposed, in which the resonance suppression control is calculated as an empirical method, and a sensor or the like capable of detecting oscillation of magnetic flux shaft current needs to be provided. As a result, there is a problem in that manufacturing costs are increased. Further, because the resonance suppression control is performed without considering a real-time deformation amount in accordance with actual resonance or management states of the apparatus, there are problems in that accuracy and reliability significantly deteriorate, and as a result, machining precision and reliability of the machine tool deteriorate.

DISCLOSURE

Summary

The present disclosure has been made in an effort to solve the above-mentioned problems, and an object of the present disclosure is to provide an apparatus and a method for controlling resonance suppression of a machine tool, wherein a resonance suppression control part adjusts electrical energy to be applied to a first servo motor and a second servo motor from a power conversion part based on an invalid torque command transmitted to the power conversion part in order to suppress resonance, which occurs when two servo motors operate in parallel, by a single power conversion part and a single servo drive, thereby achieving a stable management and an operator's convenience, controlling devices such as an automatic tool changer or an automatic palette changer operated by the servo motor, reducing manufacturing costs, reducing noise to improve reliability, and miniaturizing the apparatus.

In addition, another object of the present disclosure is to provide an apparatus and a method for controlling resonance suppression of a machine tool, wherein a resonance suppression control part adjusts electrical energy to be applied to a first servo motor and a second servo motor from a power conversion part based on an invalid torque command transmitted to the power conversion part, thereby maximizing servo control precision and reliability of an automatic tool changer or an automatic palette changer through precise control synchronized at all speeds and all positions of the two servo motors.

In order to achieve the above-mentioned objects, an apparatus for controlling resonance suppression of a machine tool according to the present disclosure includes: a numerical control part; a main operation part; a PLC configured to execute a control command by means of communication with the numerical control part or the main operation part; a servo drive configured to execute the control command of the PLC; a servo motor part configured to operate under control of the servo drive; and a power conversion part electrically connected to the servo motor part and the servo drive and configured to apply electrical energy to the servo motor part, in which the power conversion part controls resonance suppression in accordance with an operation of the servo motor part by adjusting electrical energy to be applied to the servo motor part based on a signal from the servo drive.

In addition, in another exemplary embodiment of the apparatus for controlling resonance suppression of a machine tool according to the present disclosure, the servo motor part of the apparatus for controlling resonance suppression of a machine tool may include a first servo motor and a second servo motor connected to each other in parallel, and the power conversion part may adjust electrical energy to be applied to the first servo motor and the second servo motor to control resonance that occurs when the first servo motor and the second servo motor operate in parallel.

In addition, in still another exemplary embodiment of the apparatus for controlling resonance suppression of a machine tool according to the present disclosure, the servo drive of the apparatus for controlling resonance suppression of a machine tool may include: a first servo motor feedback information storage part configured to store feedback information about a position and a speed of the first servo motor which is generated when the first servo motor and the second servo motor operate in parallel; a speed command part configured to output an operation speed signal for the servo motor part based on a position command received from the numerical control part and a feedback signal received from the first servo motor feedback information storage part; a valid torque command part configured to output a valid torque signal to be transmitted to the power conversion part to operate the servo motor part based on a speed command received from the speed command part and a feedback signal received from the first servo motor feedback information storage part; and a resonance suppression control part configured to output an invalid torque signal to be transmitted to the power conversion part.

In addition, in yet another exemplary embodiment of the apparatus for controlling resonance suppression of a machine tool according to the present disclosure, the resonance suppression control part of the servo drive of the apparatus for controlling resonance suppression of a machine tool may include: a basic data storage part configured to store information about a high-frequency gain limit value, a maximum value of interlinkage magnetic flux by an equivalent permanent magnet, a natural frequency of the servo motor part, an angular velocity at an operation point, a direct current gain of a resonance suppression controller, inductance of a winding of a stator of the servo motor part, the number of pole pairs of the servo motor part, resistance of a winding of a stator of the servo motor part, and inertia moment of force of the rotor of the servo motor part; a second servo motor feedback information storage part configured to store feedback information about a position and a speed of the second servo motor which is generated when the second servo motor and the first servo motor operate in parallel; a calculation part configured to calculate an invalid torque value to be transmitted to the power conversion part based on data stored in the basic data storage part and feedback information of the first servo motor and the second servo motor stored in the second servo motor feedback information storage part and the first servo motor feedback information storage part; and an invalid torque command part configured to output an invalid torque signal to transmit the calculated invalid torque value to the power conversion part when the invalid torque value calculated by the calculation part is not 0.

In addition, in still yet another exemplary embodiment of the apparatus for controlling resonance suppression of a machine tool according to the present disclosure, the power conversion part of the apparatus for controlling resonance suppression of a machine tool may suppress resonance, which occurs when the first servo motor and the second servo motor operate in parallel by adjusting intensity of a current and a voltage to be applied to the first servo motor and the second servo motor based on signals received from the valid torque command part and the invalid torque command part.

In order to achieve the above-mentioned object, a method of controlling resonance suppression of a machine tool according to the present disclosure includes: storing, in a basic data storage part, information about a high-frequency gain limit value, a maximum value of interlinkage magnetic flux by an equivalent permanent magnet, a natural frequency of a servo motor part, an angular velocity at an operation point, a direct current gain of a resonance suppression controller, inductance of a winding of a stator of the servo motor part, the number of pole pairs of the servo motor part, resistance of a winding of a stator of the servo motor part, and inertia moment of force of the rotor of the servo motor part; executing, by a PLC, a control command through communication with a numerical control part or a main operation part; executing, by a servo drive, the control command transmitted from the PLC; applying, by a power conversion part, electrical energy to the servo motor part having a first servo motor and a second servo motor based on a signal of the servo drive; storing, in a first servo motor feedback information storage part, feedback information about a position and a speed of the first servo motor which is generated when the first servo motor and the second servo motor operate in parallel; storing, in a second servo motor feedback information storage part, feedback information about a position and a speed of the second servo motor which is generated when the second servo motor and the first servo motor operate in parallel; and calculating, by a calculation part, an invalid torque value to be applied to the power conversion part based on data stored in the basic data storage part and feedback information of the first servo motor and the second servo motor stored in the second servo motor feedback information storage part and the first servo motor feedback information storage part, in which the power conversion part controls and suppresses resonance, which occurs when the servo motor part operates, by adjusting electrical energy to be applied to the first servo motor and the second servo motor of the servo motor part based on a value calculated by the calculation part.

In addition, in another exemplary embodiment of the method of controlling resonance suppression of a machine tool according to the present disclosure, the method of controlling resonance suppression of a machine tool may further include, after the calculating of the invalid torque value, determining whether the invalid torque value calculated by the calculation part is 0.

In addition, in still another exemplary embodiment of the method of controlling resonance suppression of a machine tool according to the present disclosure, the method of controlling resonance suppression of a machine tool may further include, after the determining of whether the invalid torque value is 0, outputting an invalid torque signal to transmit the calculated invalid torque value to the power conversion part when the invalid torque value is not 0.

The apparatus and the method for controlling resonance suppression of a machine tool according to the present disclosure adjust the electrical energy to be applied to the first servo motor and the second servo motor from the power conversion part based on the invalid torque command transmitted to the power conversion part through the resonance suppression control part, thereby suppressing resonance that occurs when the two servo motors are operated in parallel by the single power conversion part and the single servo drive. As a result, it is possible to maximize stability of tandem control and thus control the automatic tool changer or the automatic palette changer, thereby reducing costs required to manufacture the servo control apparatus and improving compatibility.

In addition, according to the apparatus and the method for controlling resonance suppression of a machine tool according to the present disclosure, the resonance, which occurs when the two servo motors operate in parallel, is controlled and suppressed in real time by the single power part and the power conversion part, and as a result, it is possible to miniaturize the servo control apparatus by removing unnecessary constituent components and to maximize spatial utilization.

Further, the apparatus and the method for controlling resonance suppression of a machine tool according to the present disclosure control and suppress, in real time, the resonance, which occurs when the two servo motors operate in parallel, by using the single power part and the power conversion part based on the feedback information of the first and second servo motors received in real time from the first and second servo motor feedback information storage parts. As the precise resonance suppression control of the two servo motors is performed in real time, it is possible to maximize precision and reliability of the servo control apparatus for the automatic tool changer or the automatic palette changer and to improve productivity and processing efficiency of the machine tool.

Moreover, the apparatus and the method for controlling resonance suppression of a machine tool according to the present disclosure automatically control and suppress, in real time, the resonance, which occurs when the two servo motors operate in parallel, by using the single power part and the power conversion part, thereby achieving the operator's convenience, minimizing the non-machining time, and maximizing productivity of the machine tool.

DESCRIPTION OF THE DRAWINGS

FIG. 1 is a conceptual view illustrating a multi-inverter/multi-servo motor manner in the related art in which each inverter and each servo drive are coupled to each servo motor.

FIG. 2 is a conceptual view illustrating a single-inverter/multi-servo motor manner in the related art in which a single inverter and a single servo drive are coupled to two servo motors so that tandem control is performed.

FIG. 3 is a block diagram illustrating a configuration of an apparatus for controlling resonance suppression of a machine tool according to an exemplary embodiment of the present disclosure.

FIG. 4 is a block diagram illustrating a configuration of a resonance suppression control part of a servo drive of the apparatus for controlling resonance suppression of a machine tool according to the exemplary embodiment of the present disclosure.

FIG. 5 is a flowchart illustrating a method of controlling resonance suppression of a machine tool according to the exemplary embodiment of the present disclosure.

FIG. 6 and FIG. 7 are graphs for explaining resonance suppression control effects obtained by the apparatus and the method for controlling resonance suppression of a machine tool according to the exemplary embodiment of the present disclosure.

DETAILED DESCRIPTION OF CERTAIN INVENTIVE EMBODIMENT

Hereinafter, an apparatus and a method for controlling resonance suppression of a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present invention is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of

DESCRIPTION

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

FIG. 3 is a block diagram illustrating a configuration of an apparatus for controlling resonance suppression of a machine tool according to an exemplary embodiment of the present disclosure, FIG. 4 is a block diagram illustrating a configuration of a resonance suppression control part of a servo drive of the apparatus for controlling resonance suppression of a machine tool according to the exemplary embodiment of the present disclosure, and FIG. 5 is a flowchart illustrating a method of controlling resonance suppression of a machine tool according to the exemplary embodiment of the present disclosure. FIGS. 6 to 7 are graphs for explaining resonance suppression control effects obtained by the apparatus and the method for controlling resonance suppression of a machine tool according to the exemplary embodiment of the present disclosure.

An apparatus 1 for controlling resonance suppression of a machine tool according to an exemplary embodiment of the present disclosure will be described with reference to FIGS. 3 to 4. As illustrated in FIGS. 3 and 4, the apparatus 1 for controlling resonance suppression of a machine tool according to the exemplary embodiment of the present disclosure includes a numerical control part 100, a main operation part 200, a PLC 300, a servo drive 400, a servo motor part 600, and a power conversion part 500.

The numerical control part 100 includes numerical control (NC) or computerized numerical control (CNC) and embedded with various types of numerical control programs. That is, the numerical control part 100 is embedded with a program for driving the servo motor and a program for operating a tool, and the corresponding program is automatically loaded and executed in accordance with the operation of the numerical control part. In addition, the numerical control part 100 communicates with the main operation part 200, the PLC 300, and the servo drive 400 by means of a predetermined protocol.

In addition, the numerical control part 100 receives feedback information from a first servo motor 610 or a second servo motor 620 of the servo motor part 600 which is used to operate an automatic tool changer (ATC) or an automatic palette changer (APC). More specifically, the numerical control part 100 receives feedback information about a position and a speed of the first servo motor 610 or the second servo motor 620 from a first servo motor feedback information storage part 440 or a second servo motor feedback information storage part 432 which will be described below.

The main operation part 200 includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

In addition, the main operation part 200 has a monitor installed in or at one side of a housing or a casing of the machine tool and capable of displaying multifunctional switches or buttons and various types of information, but the present invention is not necessarily limited thereto.

The PLC (programmable logic controller) 300 communicates with the numerical control part 100 or the main operation part 200 through the predetermined protocol and serves to execute a control command through this communication. That is, the PLC 300 operates by receiving a control command based on the numerical control program for the numerical control part 100 or the main operation part 200.

In addition, the PLC 300 receives the control command from the numerical control part 100 or the main operation part 200, executes the control command, outputs the control command to the numerical control part 100, and transmits the control command to the servo drive 400 through the main operation part 200. As necessary, the PLC 300 may transmit a real-time control command from a user to the servo drive 400 through the main operation part 200.

The servo drive 400 executes the control command of the PLC 300. That is, the servo drive 400 controls an operation of a servo motor of a servo motor part 500, which will be described below, by means of the control command of the PLC 300, and as a result, the servo drive 400 controls operations of various components of the machine tool, such as the automatic tool changer (ATC), the automatic palette changer (APC), a tailstock, or a steady rest, which is operated by the servo motor. The servo drive 400 transmits a control result to the PLC 300 through a contact point or communication by means of the predetermined protocol.

In addition, the servo drive 400 receives the feedback information from the first servo motor 610 or the second servo motor 620 of the servo motor part 600 which is used to operate the automatic tool changer (ATC) or the automatic palette changer (APC). More specifically, the numerical control part 100 receives feedback information about the position and the speed of the first servo motor 610 or the second servo motor 620 from the first servo motor feedback information storage part 440 or the second servo motor feedback information storage part 432 which will be described below.

The servo motor part 600 operates under the control of the servo drive 400.

As illustrated in FIG. 3, the servo motor part 600 of the servo control apparatus 1 of the machine tool according to the exemplary embodiment of the present disclosure includes the first servo motor 610 and the second servo motor 620.

The first servo motor 610 and the second servo motor 620 are connected, in parallel, to the power conversion part 500 to be described below and operate in parallel by means of electrical energy applied from the power conversion part 500 in accordance with the control signal of the servo drive.

In addition, the first servo motor 610 or the second servo motor 620 of the servo motor part 600 is operated under the control of the servo drive 400 in accordance with corresponding sequence information and position information or a program.

The power conversion part 500 is electrically connected to the servo motor part 600 and the servo drive 400. In addition, the power conversion part 500 applies electrical energy to the servo motor part 600 based on a contact point signal of the servo drive 400.

As described above, the apparatus for controlling resonance suppression of a machine tool according to the present disclosure adjusts electrical energy to be applied to the servo motor part 600 through the power conversion part 500 based on the signal of the servo drive 400, thereby suppressing resonance that occurs due to the parallel operation of the first servo motor 610 and the second servo motor 620 of the servo motor part 600. Specifically, the power conversion part 500, which receives an applied valid torque command signal and an applied invalid torque command signal from the servo drive, applies different currents and different voltages to the first servo motor 610 and the second servo motor 620, respectively, to adjust, in real time, electrical energy to be applied to the first servo motor 610 and the second servo motor 620, thereby controlling and suppressing resonance that occurs when the first servo motor 610 and the second servo motor 620 operate in parallel.

Therefore, according to the apparatus for controlling resonance suppression of a machine tool according to the present disclosure, the power conversion part adjusts the electrical energy to be applied to the first servo motor and the second servo motor based on the invalid torque command transmitted to the power conversion part through the servo drive, thereby suppressing resonance that occurs when the two servo motors are operated in parallel by the single power conversion part and the single servo drive. As a result, it is possible to maximize stability of tandem control and thus control the automatic tool changer or the automatic palette changer, thereby reducing costs required to manufacture the servo control apparatus and improving compatibility.

As illustrated in FIG. 3, the servo drive 400 of the apparatus 1 for controlling resonance suppression of a machine tool according to the exemplary embodiment of the present disclosure includes a speed command part 410, a valid torque command part 420, a resonance suppression control part 430, and the first servo motor feedback information storage part 440.

Although not illustrated in the drawings, the servo drive 400 of the apparatus for controlling resonance suppression of a machine tool may further include a controller, as necessary. The controller is installed in the servo drive 400, detailed control command decoding programs, various types of processing programs, or drive programs are separately embedded in the controller. In addition, the controller communicates with the numerical control part 100, the main operation part 200, the PLC 300, the servo motor part 600, and the power conversion part 500 by means of the predetermined protocol.

As necessary, the main operation part 200 may transmit the control command of the main operation part to the servo drive 400 through the PLC 300 without passing through the numerical control part 100.

As described above, since all the detailed control command decoding programs or all the separate control programs are embedded in the controller of the servo drive 400 to be described below, it is possible to operate the servo motor part 600 to be described below by allowing the servo drive 400 to execute the command through the main operation part 200 and the PLC 300 without receiving a drive command of the servo motor part 500 from the numerical control part 100.

Therefore, the detailed control command to be performed by the numerical control part 100 may be executed by the controller of the servo drive 400, such that a servo drive function may be performed by programming only the protocol function together with another numerical control part, and various programs may be executed by the servo drive, thereby maximizing compatibility of equipment, and achieving the user's convenience.

The speed command part 410 outputs an operation speed signal of the servo motor part 600 in accordance with a position command received from the numerical control part 100 and a feedback signal of the first servo motor 610 received from the first servo motor feedback information storage part 440.

Specifically, when the servo control apparatus initially operates, the speed command part 410 outputs the operation speed signal of the servo motor part 600 based on the position command initially received from the numerical control part 100 to the state before the first servo motor 610 and the second servo motor 620 operate in parallel. Thereafter, the feedback information of the first servo motor 610, which occurs as the first servo motor 610 and the second servo motor 620 of the servo motor part 600 operate in parallel based on the speed command outputted from the speed command part 410, is transmitted to the first servo motor feedback information storage part 440, and after the initial operation, the operation speed signal of the servo motor part 600 is outputted based on the feedback signal transmitted through the first servo motor feedback information storage part 440 and the position command received from the numerical control part 100.

The valid torque command part 420 outputs a valid torque signal to be transmitted to the power conversion part 500 to operate the servo motor part 600 based on the speed command received from the speed command part 410 and the feedback signal received from the first servo motor feedback information storage part 440.

Specifically, when the servo control apparatus initially operates, the valid torque command part 420 outputs the valid torque signal to be applied to the power conversion part 500 to operate the servo motor part 600 based on the speed command initially received from the speed command part 410 to the state before the first servo motor 610 and the second servo motor 620 operate in parallel. Thereafter, the feedback information of the first servo motor 610, which occurs as the power conversion part 500 operates the first servo motor 610 and the second servo motor 620 of the servo motor part 600 and allows the first servo motor 610 and the second servo motor 620 to operate in parallel based on the valid torque signal outputted from the valid torque command part 420, is transmitted to the first servo motor feedback information storage part 440, and after the initial operation, the valid torque signal to be transmitted to the power conversion part 500 is outputted based on the feedback signal transmitted through the first servo motor feedback information storage part 440 and the operation speed signal received from the speed command part 410.

The resonance suppression control part 430 outputs the invalid torque signal to be transmitted to the power conversion part 500 after the first servo motor 610 and the second servo motor 620 of the servo motor part 600 operate in parallel after the initial operation of the servo control apparatus, thereby performing the function of suppressing and controlling resonance that occurs as the first servo motor 610 and the second servo motor 620 operate in parallel.

The first servo motor feedback information storage part 440 stores feedback information about the position and the speed of the first servo motor 610 which is generated when the first servo motor 610 and the second servo motor 620 operate in parallel.

The speed command part 410, the valid torque command part 420, the resonance suppression control part 430, and the first servo motor feedback information storage part 440 are installed in the servo drive 400, and the detailed control command decoding programs, various types of processing programs, or the drive programs may be separately embedded. In addition, the speed command part 410, the valid torque command part 420, the resonance suppression control part 430, and the first servo motor feedback information storage part 440 may communicate with the numerical control part 100, the main operation part 200, the PLC 300, the servo motor part 600, and the power conversion part 500 by means of the predetermined protocol.

Therefore, according to the apparatus for controlling resonance suppression of a machine tool according to the present disclosure, the resonance, which occurs when the two servo motors operate in parallel, is controlled and suppressed in real time by the single power part and the power conversion part, and as a result, it is possible to miniaturize the servo control apparatus by removing unnecessary constituent components and to maximize spatial utilization.

As illustrated in FIG. 4, the resonance suppression control part 430 of the servo drive 400 of the apparatus 1 for controlling resonance suppression of a machine tool according to the exemplary embodiment of the present disclosure includes a basic data storage part 431, a second servo motor feedback information storage part 432, a calculation part 433, and an invalid torque command part 434.

The basic data storage part 431, the second servo motor feedback information storage part 432, the calculation part 433, and the invalid torque command part 434 are installed in the resonance suppression control part 430, and the detailed control command decoding programs, various types of processing programs, or the drive programs may be separately embedded. In addition, the basic data storage part 431, the second servo motor feedback information storage part 432, the calculation part 433, and the invalid torque command part 434 may communicate with the numerical control part 100, the main operation part 200, the PLC 300, the servo motor part 600, the power conversion part 500, the speed command part 410, the valid torque command part 420, and the first servo motor feedback information storage part 440 by means of the predetermined protocol.

The basic data storage part 431 stores information about a high-frequency gain limit value, a maximum value of interlinkage magnetic flux generated by an equivalent permanent magnet, a natural frequency of the servo motor part, an angular velocity at an operation point, a direct current gain of the resonance suppression controller, inductance of a winding of a stator of the servo motor part, the number of pole pairs of the servo motor part, stator winding resistance of the servo motor part, and inertia moment of force of a rotor of the servo motor part.

The storage of the basic data may be performed by the operator through the numerical control part 100 or the main operation part 200, or the basic data may be stored in the form of a program in the PLC 300.

The second servo motor feedback information storage part 432 stores feedback information about the position and the speed of the second servo motor 620 which is generated when the second servo motor 620 and the first servo motor 610 operate in parallel.

As described above, the second servo motor feedback information storage part 432 may be electrically connected to the speed command part 410, the valid torque command part 420, and the first servo motor feedback information storage part 440 and may communicate with the speed command part 410, the valid torque command part 420, and the first servo motor feedback information storage part 440 by means of the predetermined protocol.

The calculation part 433 calculates the invalid torque value to be transmitted to the power conversion part 500 based on the data stored in the basic data storage part 431 and the feedback information of the first servo motor 610 and the second servo motor 620 stored in the second servo motor feedback information storage part 432 and the first servo motor feedback information storage part 440.

In a case in which the invalid torque value calculated by the calculation part 433 is not 0, the invalid torque command part 434 outputs the invalid torque signal in order to transmit the calculated invalid torque value to the power conversion part 500. The invalid torque command part 434 is electrically connected to the power conversion part 500 and the valid torque command part 420 and communicates with the power conversion part 500 and the valid torque command part 420 by means of the predetermined protocol.

Therefore, the apparatus for controlling resonance suppression of a machine tool according to the present disclosure suppresses, in real time, the resonance, which occurs when the two servo motors operate in parallel, by using the single power part and the power conversion part based on the feedback information of the first and second servo motors received in real time from the first and second servo motor feedback information storage parts. Accordingly, the precise resonance suppression control of the two servo motors is performed in real time, such that it is possible to maximize precision and reliability of the servo control apparatus for the automatic tool changer or the automatic palette changer and to improve productivity and processing efficiency of the machine tool.

The calculation part 433 of the resonance suppression control part 430 calculates the invalid torque value to be transmitted to the power conversion part 500 in order to suppress resonance based on the following principle.

When state variables are expressed as $X = X_0 + \Delta X$ in a steady state and a linearized state equation is obtained using the Taylor series and calculated by Equation 1.

$$\frac{d\Delta x}{dt} = A(x_0)\Delta x + B(x_0)\Delta u \quad \text{[Equation 1]}$$

$$\Delta x^t = [\Delta i_{ds}^r \ \Delta i_{qs}^r \ \Delta i_{ds}^\omega \ \Delta i_{qs}^\omega \ \Delta \omega_{re}^r \ \Delta \delta]$$

$$\Delta u^t = [\Delta v_{ds}^r \ \Delta v_{qs}^r \ \Delta v_{ds}^\omega \ \Delta v_{qs}^\omega \ \Delta \omega_{re}^r]$$

$$A = \begin{bmatrix} -\frac{R_s}{L_s} & \omega_s & 0 & 0 & 0 & 0 \\ -\omega_s & -\frac{R_s}{L_s} & 0 & 0 & 0 & 0 \\ 0 & 0 & -\frac{R_s}{L_s} & 0 & -\frac{\Phi_f \sin\delta_0}{L_s} & -\frac{\Phi_f \omega_0 \sin\delta_0}{L_s} \\ 0 & 0 & 0 & -\frac{R_s}{L_s} & -\frac{\Phi_f \omega_0 \cos\delta_0}{L_s} & \frac{\Phi_f \sin\delta_0}{L_s} \\ 0 & \frac{3P_f^2 \Phi_f}{2J} & \frac{3P_f^2 \Phi_f \sin\delta_0}{2J} & \frac{3P_f^2 \Phi_f \cos\delta_0}{2J} & 0 & \frac{3P_f^2 \Phi_f (i_{d0}^\omega \cos\delta_0 - i_{q0}^\omega \sin\delta_0)}{2J} \\ 0 & 0 & 0 & 0 & -1 & 0 \end{bmatrix}$$

$$B = \begin{bmatrix} (1/L_s) & 0 & 0 & 0 & 0 \\ 0 & (1/L_s) & 0 & 0 & 0 \\ 0 & 0 & (1/L_s) & 0 & i_{q0}^\omega \\ 0 & 0 & 0 & (1/L_s) & i_{d0}^\omega \\ 0 & 0 & 0 & 0 & 0 \\ 0 & 0 & 0 & 0 & 1 \end{bmatrix}$$

However, Equation 1 shows that the servo control apparatus operating in parallel is too complex to evaluate stability.

Accordingly, in order to simplify Equation 1, it is assumed that a mechanical time constant of the servo motor is sufficiently larger than an electrical time constant, and Equation 1 is summarized to obtain Equation 2.

$$p\begin{bmatrix} \Delta \omega_{re}^r \\ \Delta \delta \end{bmatrix} = \begin{bmatrix} -\frac{3}{2} \frac{P_f^2 \Phi_f^2}{J} \frac{R_s}{\omega_0^2 L_s^2} & \frac{3}{2} \frac{P_f^2 \Phi_f^2}{JL_s} \\ -1 & 0 \end{bmatrix} \quad \text{[Equation 2]}$$

$$\begin{bmatrix} \Delta \omega_{re}^r \\ \Delta \delta \end{bmatrix} + \begin{bmatrix} \frac{3}{2} \frac{P_f^2 \Phi_f^2}{J} \frac{R_s}{\omega_0^2 L_s^2} & -\frac{3}{2} \frac{P_f^2 \Phi_f^2}{JR_s} & 0 \\ 0 & 0 & 1 \end{bmatrix} \begin{bmatrix} \Delta v_{re}^r \\ \Delta v_{re}^\omega \\ \Delta \omega_{re}^\omega \end{bmatrix}$$

Therefore, a transfer function obtained from Equation 2 is shown in Equation 3.

$$G(s) = \frac{\Delta \omega_{re}^r}{\Delta \omega_{re}^\omega} = \frac{\frac{3}{2} \frac{P_f^2 \Phi_f^2}{JL_s}}{s^2 + \frac{3}{2} \frac{P_f^2 \Phi_f^2}{J} \frac{R_s}{\omega_0^2 L_s^2} s + \frac{3}{2} \frac{P_f^2 \Phi_f^2}{JL_s}} \quad \text{[Equation 3]}$$

A damping coefficient of the servo control apparatus operating in parallel and a frequency at which resonance occurs are calculated by Equation 4 from Equation 3 which is a characteristic equation, that is, the transfer function.

$$C(s) = K \frac{T_l s + 1}{\alpha_l T_l s + 1} \quad \text{[Equation 5]}$$

In the servo control apparatus operated in parallel and managed by tandem control calculated by Equation 4, a calculation formula in the calculation part of the resonance suppression control part is finally expressed by Equation 5.

$$c = \sqrt{\frac{3}{2}} \sqrt{\frac{JL_s}{2}} \frac{P_f \Phi_f}{J} \frac{R_s}{\omega_0^2 L_s^2} \quad \text{[Equation 4]}$$

$$\omega_n = \sqrt{\frac{3}{2}} \frac{P_f \Phi_f}{\sqrt{JL_s}}$$

That is, the calculation part 433 of the resonance suppression control part 430 calculates, by Equation 5, an invalid torque value to be transmitted to the power conversion part through the feedback information of the first servo motor and the second servo motor. Here, in order to limit the gain value in a high-frequency region, α1 and a time constant T1 at which the phase is maximum may be obtained directly from Equation 4, such that it is possible to substantially reduce trial and error when determining the gain of the resonance suppression control part.

The respective factors shown in Equations 1 to 5 will be described below.

$\alpha_i$: High-frequency gain limit value
i: Torque angle between $V_t$ and $E_t$
δ: Torque angle in transient state
Δδ: Linearized torque angle
Δu: Variation component of input variable
Δx: Variation component of state variable
$\Delta \omega_{re}^r$: Linearized rotor angular velocity c: Damping integer
θ: Any rotor position
$\lambda_{uvw}$: Interlinkage magnetic flux of stator winding
$\Phi_d$: Air gap magnetic flux
$\Phi_t$: Maximum value of interlinkage magnetic flux by equivalent permanent magnet
$\Phi_m$: Permanent magnet magnetic flux
$\Phi_{max}$: Maximum phase
$\Phi_s$: Electric reaction magnetic flux
φ: Power factor angle between $V_t$ and $I_d$
Ψ: Inner power angle between $I_d$ and $E_t$
$\omega_n$: Natural frequency of system
$\omega_{max}$: Maximum phase frequency
$\omega_0$: Angular velocity at operation point
$\omega_{re}^r$: Angular velocity of rotor
$\omega_{re}^\omega$: Any angular velocity
$\omega_s$: Synchronous angular velocity
$E_t$: Excitation voltage
$\grave{E}_t$: Excitation voltage in transient state
$I_\alpha$: Electric current
$i_{uvw}$: Three-phase current
$i_{ds}^r, i_{as}^r$: $d^r$-$q^r$ axis stator current in rotary coordinate system
$i_{ds}^\omega, i_{as}^\omega$: $d^\omega$-$q^\omega$ axis stator current in any coordinate system
$i_{ds}^{r*}, i_{as}^{r*}$: $d^r$-$q^r$ axis stator command current in rotary coordinate system
$i_{ds}^{\omega*}, i_{as}^{\omega*}$: $d^\omega$-$q^\omega$ axis stator command current in any coordinate system
$K_x$: Damping gain
$K_\theta(\theta_d)$: Linear function profile
$K_i$: Direct current gain of resonance suppression controller
$L_s$: Inductance of electric motor stator winding
$P_t$: Number of pole pairs of electric motor
$R_s$: Resistance of electric motor stator winding
T: Mechanical output torque in transient state
$T_{max}$: Mechanical output torque maximum value in transient state
$T_\theta^r$: $d^d$-$q^r$ axis output torque in rotary coordinate system
$T_\theta^\omega$: $d^\omega$-$q^\omega$ axis output torque in any coordinate system
$T_L$: Load torque
$T_i$: Maximum phase time integer
$V_t$: Terminal voltage
$v_{uvw}$: Three-phase voltage
$v^*_{dq}$: Voltage command in d and q axes
$X_s$: Synchronous reactance in transient state
x: State variable
$x_0$: State variable at operation point
$X_s$: Synchronous reactance
J: Inertia moment of force of motor rotor
S: α+jω
In S: α+jω, α is a real number, and jω is an imaginary number, that is, S is a factor indicating a size and a phase in a frequency space.

As described above, according to the apparatus for controlling resonance suppression of a machine tool according to the present disclosure, the calculation part precisely and quickly calculates, in real time, the invalid torque command for suppressing resonance, which occurs when the two servo motors operate in parallel, based on the feedback information of the first servo motor and the second servo motor in accordance with the parallel operation of the first servo motor and the second servo motor, thereby achieving the convenience of the operator by adjusting magnitudes of the current and the voltage to be transmitted to the first servo motor and the second servo motor through the power conversion part and controlling and suppressing resonance that occurs when the first servo motor and the second servo motor operate in parallel. Further, the amount of time required for maintenance caused by breakage or damage of the servo control apparatus caused by the occurrence of resonance may be reduced, thereby minimizing the non-machining time, maximizing productivity of the machine tool, and maximizing reliability and stability of the machine tool.

The power conversion part 500 may adjust intensity of the current and the voltage to be applied to the first servo motor 610 and the second servo motor 620 based on the signal transmitted from the invalid torque command part 434 by the invalid torque value calculated by the valid torque command part 420 and the calculation part 433, thereby most effectively and accurately suppressing, in real time, resonance that occurs when the first servo motor 610 and the second servo motor 620 operate in parallel.

Therefore, the apparatus for controlling resonance suppression of a machine tool according to the present disclosure may automatically suppress and control, in real time, resonance, which occurs when the two servo motors operate in parallel, by the single power part and the power conversion part, thereby achieving the operator's convenience, minimizing the non-machining time, and maximizing productivity of the machine tool.

In addition, although not illustrated in the drawings, the apparatus 1 for controlling resonance suppression of a machine tool according to the exemplary embodiment of the present disclosure may further include an input part and a display part.

The input part is installed in the form of a switch or a touch button on a control panel or a main operation part and serves to allow the operator to optionally select the operation of performing or not performing the real time resonance suppression control when the servo motor part operates in parallel.

That is, when the operator does not select, through the input part, the function of the control apparatus that suppresses resonance when the two servo motors of the servo motor part of the servo control apparatus of the machine tool operate in parallel, the servo control apparatus of the machine tool does not perform the resonance suppression control function.

The display part displays the invalid torque value of the calculation part, the valid torque value of the valid torque command part, the current processing program, types of workpieces, and the like. Therefore, the operator may check, with the naked eye, in real time, the control state and whether the resonance suppression is performed when the two servo motors of the servo motor part operate in parallel.

The display part may include an LCD, LED, or PDP monitor provided on the main operation part or the numerical control part, but the present disclosure is not necessarily limited thereto.

As illustrated in FIG. 5, the method of controlling resonance suppression of a machine tool according to the exemplary embodiment of the present disclosure includes a step S1 of storing the basic data, a step S2 of executing the control command by the PLC, a step S3 of executing the control command by the servo drive, a step S4 of applying, by the power conversion part, electrical energy to the servo motor part, a step S5 of storing the feedback information of the first servo motor, a step S6 of storing the feedback information of the second servo motor, a step S7 of calculating the invalid torque, a step S8 of determining whether the invalid torque value is 0, and a step S9 of transmitting the invalid torque command. The specific performance or content of the apparatus in each step is the same as the apparatus for controlling resonance suppression of a machine tool disclosed in the specification of the present disclosure, and the description will be made below focusing on the characteristics of the method of controlling resonance suppression of a machine tool.

The basic data storage part 431 stores information about the high-frequency gain limit value, the maximum value of interlinkage magnetic flux generated by the equivalent permanent magnet, the natural frequency of the servo motor part, the angular velocity at the operation point, the direct current gain of the resonance suppression controller, the inductance of the winding of the stator of the servo motor part, the number of pole pairs of the servo motor part, the stator winding resistance of the servo motor part, and the inertia moment of force of the rotor of the servo motor part. The storage of the basic data may be performed by the operator through the numerical control part 100 or the main operation part 200, or the basic data may be stored in the form of a program in the PLC 300.

After step S1 of storing the basic data storage part, the control command is executed by the PLC 300 through the communication with the numerical control part 100 or the main operation part 200.

After step S2 of executing the control command by the PLC, the control command transmitted from the PLC 300 is executed by the servo drive 400.

After step S3 of executing the control command by the servo drive, the power conversion part 500 applies electrical energy to the servo motor part 600 having the first servo motor 610 and the second servo motor 620 based on the signal of the servo drive 400. Specifically, the power conversion part 500 transmits the calculated electrical energy to the first servo motor 610 and the second servo motor 620. As described above, since the resonance caused by the parallel operation of the first servo motor and the second servo motor does not occur when the servo control apparatus initially operates, the electrical energy is applied, at the initial time, to the first servo motor 610 and the second servo motor 620 through the power conversion part 500 based on a processing program or a control protocol stored in the numerical control part, the main control panel, and the PLC.

After step S4 of applying electrical energy to the servo motor part by the power conversion part, the first servo motor feedback information storage part 440 stores the feedback information about the position and the speed of the first servo motor 610 which is generated when the first servo motor 610 and the second servo motor 620 operate in parallel.

After step S5 of storing the first servo motor feedback information, the second servo motor feedback information storage part 432 stores the feedback information about the position and the speed of the second servo motor 620 which is generated when the second servo motor 620 and the first servo motor 610 operate parallel.

After step S6 of storing the second servo motor feedback information, the calculation part 433 calculates, through the Equation 5, the invalid torque value to be transmitted to the power conversion part 500 based on the data stored in the basic data storage part 431 and the feedback information of the first servo motor 610 and the second servo motor 620 stored in the second servo motor feedback information storage part 432 and the first servo motor feedback information storage part 440.

After step S7 of calculating the invalid torque, whether the invalid torque value calculated by the calculation part 433 is 0 is determined.

After step S8 of determining whether the invalid torque value is 0, when the invalid torque value is not 0, the invalid torque command part 434 outputs the invalid torque signal to transmit the calculated invalid torque value to the power conversion part 500.

Based on the value calculated by the calculation part, the power conversion part controls and suppresses resonance, which occurs by the operation of the servo motor part, by adjusting electrical energy applied to the first servo motor and the second servo motor of the servo motor part.

That is, based on the valid torque value transmitted from the valid torque command part 420 and the invalid torque value transmitted from the invalid torque command part 434, the power conversion part 500 adjusts electrical energy, that is, the intensity of the current and the voltage to be applied to the first servo motor 610 and the second servo motor 620 of the servo motor part 600, thereby suppressing resonance and accurately and quickly controlling and suppressing, in real time, resonance that occurs when the two servo motors operate in parallel.

Therefore, according to the method of controlling resonance suppression of a machine tool according to the present disclosure adjusts the electrical energy to be applied to the first servo motor and the second servo motor from the power conversion part based on the invalid torque command transmitted to the power conversion part through the resonance suppression control part, thereby suppressing resonance that occurs when the two servo motors are operated in parallel by the single power conversion part and the single servo drive. As a result, it is possible to maximize stability of tandem control and thus control the automatic tool changer or the automatic palette changer, thereby reducing costs required to manufacture the servo control apparatus and improving compatibility.

The effect of the apparatus and the method for controlling resonance suppression of a machine tool according to the present disclosure will be described more specifically with reference to FIGS. 6 to 7. FIG. 6 is a Bode diagram illustrating a change in amount of vibration in accordance with frequencies, and FIG. 7 is a Bode diagram illustrating a phase difference in accordance with frequencies. In FIGS. 6 to 7, the solid line indicates the parallel operation of the two servo motors of the servo control apparatus in the related art, and the dotted line indicates a state in which the apparatus and the method for controlling resonance suppression of a machine tool according to the present disclosure is applied.

As can be seen from FIGS. 6 to 7, in the case of the servo control apparatus in the related art to which the tandem control is applied, resonance occurs, and a phase angle is approximately 9 degrees based on the angle of 180 degrees. In contrast, in the case in which the apparatus and the method for controlling resonance suppression of a machine tool according to the present disclosure is applied, there is no inflection point, and thus no resonance occurs, such that the resonance is perfectly suppressed, and the phase angle is 60 degrees based on the angle of 180 degrees. As a result, the apparatus and the method for controlling resonance suppression of a machine tool according to the present disclosure may ensure stability and reliability higher than six or more times those in the related art.

That is, the apparatus and the method for controlling resonance suppression of a machine tool according to the present disclosure calculates, in real time, the invalid torque value through Equation 5 by the calculation part and transmits the valid torque signal and the invalid torque signal to the power conversion part, and the power conversion part controls, in real time, electrical energy to be applied when the first servo motor and the second servo motor operate in parallel, thereby ensuring stability and reliability by approximately 6.2 times against disturbance.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

DESCRIPTION OF MAIN REFERENCE NUMERALS OF DRAWINGS

1: Resonance suppression control apparatus
10: First servo drive
11: Second servo drive
20: First inverter
21: Second inverter
30: First servo motor
31: Second servo motor
100: Numerical control part
200: Main operation part
300: PLC
400: Servo drive
410: Speed command part
420: Valid torque command part
430: Resonance suppression control part
431: Basic data storage part
432: Second servo motor feedback information storage part
433: Calculation part
434: Invalid torque command part
440: First servo motor feedback information storage part
500: Power conversion part
600: Servo motor part
610: First servo motor
620: Second servo motor

The invention claimed is:

1. An apparatus for controlling resonance suppression of a machine tool, the apparatus comprising:
a numerical control part;
a main operation part;
a PLC configured to execute a control command by means of communication with the numerical control part or the main operation part;
a servo drive configured to execute the control command of the PLC;
a servo motor part configured to operate under control of the servo drive; and
a power conversion part electrically connected to the servo motor part and the servo drive and configured to apply electrical energy to the servo motor part,
wherein the power conversion part controls resonance suppression in accordance with an operation of the servo motor part by adjusting electrical energy to be applied to the servo motor part based on a signal from the servo drive,
wherein the servo motor part comprises a first servo motor and a second servo motor connected to each other in parallel, and the power conversion part adjusts electrical energy to be applied to the first servo motor and the second servo motor to control resonance that occurs when the first servo motor and the second servo motor operate in parallel.

2. The apparatus of claim 1, wherein the servo drive comprises:
a first servo motor feedback information storage part configured to store feedback information about a position and a speed of the first servo motor which is generated when the first servo motor and the second servo motor operate in parallel;
a speed command part configured to output an operation speed signal for the servo motor part based on a position command received from the numerical control part and a feedback signal received from the first servo motor feedback information storage part;
a valid torque command part configured to output a valid torque signal to be transmitted to the power conversion part to operate the servo motor part based on a speed command received from the speed command part and a feedback signal received from the first servo motor feedback information storage part; and
a resonance suppression control part configured to output an invalid torque signal to be transmitted to the power conversion part.

3. The apparatus of claim 2, wherein the resonance suppression control part comprises:
a basic data storage part configured to store information about a high-frequency gain limit value, a maximum value of interlinkage magnetic flux by an equivalent permanent magnet, a natural frequency of the servo motor part, an angular velocity at an operation point, a direct current gain of a resonance suppression controller, inductance of a winding of a stator of the servo motor part, the number of pole pairs of the servo motor part, resistance of a winding of a stator of the servo motor part, and inertia moment of force of the rotor of the servo motor part;
a second servo motor feedback information storage part configured to store feedback information about a position and a speed of the second servo motor which is generated when the second servo motor and the first servo motor operate in parallel;
a calculation part configured to calculate an invalid torque value to be transmitted to the power conversion part based on data stored in the basic data storage part and feedback information of the first servo motor and the second servo motor stored in the second servo motor feedback information storage part and the first servo motor feedback information storage part; and
an invalid torque command part configured to output an invalid torque signal to transmit the calculated invalid torque value to the power conversion part when the invalid torque value calculated by the calculation part is not 0.

4. The apparatus of claim 3, wherein the power conversion part suppresses resonance, which occurs when the first servo motor and the second servo motor operate in parallel by adjusting intensity of a current and a voltage to be applied to the first servo motor and the second servo motor based on signals received from the valid torque command part and the invalid torque command part.

5. A method of controlling resonance suppression of a machine tool, the method comprising:
storing, in a basic data storage part, information about a high-frequency gain limit value, a maximum value of interlinkage magnetic flux by an equivalent permanent magnet, a natural frequency of a servo motor part, an angular velocity at an operation point, a direct current gain of a resonance suppression controller, inductance of a winding of a stator of the servo motor part, the number of pole pairs of the servo motor part, resistance of a winding of a stator of the servo motor part, and inertia moment of force of the rotor of the servo motor part;

executing, by a PLC, a control command through communication with a numerical control part or a main operation part;

executing, by a servo drive, the control command transmitted from the PLC;

applying, by a power conversion part, electrical energy to the servo motor part having a first servo motor and a second servo motor based on a signal of the servo drive;

storing, in a first servo motor feedback information storage part, feedback information about a position and a speed of the first servo motor which is generated when the first servo motor and the second servo motor operate in parallel;

storing, in a second servo motor feedback information storage part, feedback information about a position and a speed of the second servo motor which is generated when the second servo motor and the first servo motor operate in parallel; and calculating, by a calculation part, an invalid torque value to be applied to the power conversion part based on data stored in the basic data storage part and feedback information of the first servo motor and the second servo motor stored in the second servo motor feedback information storage part and the first servo motor feedback information storage part, wherein the power conversion part controls and suppresses resonance, which occurs when the servo motor part operates, by adjusting electrical energy to be applied to the first servo motor and the second servo motor of the servo motor part based on a value calculated by the calculation part.

6. The method of claim 5, further comprising:

after the calculating of the invalid torque value, determining whether the invalid torque value calculated by the calculation part is 0.

7. The method of claim 6, further comprising:

after the determining of whether the invalid torque value is 0, outputting an invalid torque signal to transmit the calculated invalid torque value to the power conversion part when the invalid torque value is not 0.

* * * * *